(12) United States Patent
Lin (10) Patent No.: US 12,417,698 B2
(45) Date of Patent: Sep. 16, 2025

(54) METHOD OF GENERATING AND PROMPTING TRAFFIC INFORMATION, AND ROADSIDE DEVICE THEREOF

(71) Applicant: HON HAI PRECISION INDUSTRY CO., LTD., New Taipei (TW)

(72) Inventor: Yu-Heng Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 82 days.

(21) Appl. No.: 18/592,744

(22) Filed: Mar. 1, 2024

(65) Prior Publication Data
US 2025/0218287 A1    Jul. 3, 2025

(30) Foreign Application Priority Data
Dec. 29, 2023   (CN) .......................... 202311868165.6

(51) Int. Cl.
*H04W 4/80* (2018.01)
*G08G 1/01* (2006.01)
*H04W 4/44* (2018.01)

(52) U.S. Cl.
CPC ......... *G08G 1/0141* (2013.01); *G08G 1/0116* (2013.01); *G08G 1/0133* (2013.01); *H04W 4/44* (2018.02); *H04W 4/80* (2018.02)

(58) Field of Classification Search
None
See application file for complete search history.

(56) References Cited

FOREIGN PATENT DOCUMENTS

CN          112991716 A       6/2021

*Primary Examiner* — Mathew Franklin Gordon
(74) *Attorney, Agent, or Firm* — ScienBiziP, P.C.

(57) ABSTRACT

A method of generating and prompting traffic information includes receiving traffic accident information transmitted by a traffic control center. An influence range of the traffic accident according to the traffic accident information is determined. Traffic information in the influence range is obtained. The obtained traffic information is transmitted to the at least one receiving terminal device in response to the at least one receiving terminal device appears in a communication range. After the traffic accident information is transmitted by the traffic control center, the roadside device determines the influence range. When the receiving terminal device appears in the communication range, the roadside device transmits the obtained traffic information, for making the receiving terminal device to notice the desired traffic information in time. Time and labor are saved. The traffic information reflects an effect of the traffic accident in time. A roadside device is also provided.

14 Claims, 5 Drawing Sheets

METHOD OF GENERATING AND PROMPTING TRAFFIC INFORMATION, AND ROADSIDE DEVICE THEREOF

TECHNICAL FIELD

The present application generally relates to road traffic technology, and particular to a method of generating and prompting traffic information and a roadside device thereof.

BACKGROUND

Currently, users, such as vehicle drivers or pedestrian, obtain traffic information from a traffic control center by a mobile web. The users need to find out the traffic information of a specific region manually, or remove the traffic information besides the specific region, which is laborious. Radio broadcast also used to play the traffic information, and take turns playing programme and the traffic information. The user fails to obtain the traffic information in time, and the traffic information played by the broadcast maybe not the specific traffic information wanted to know by the users.

There is room to for improvement in the art.

BRIEF DESCRIPTION OF THE DRAWINGS

Implementations of the present application will now be described, by way of example only, with reference to the attached figures.

DETAILED DESCRIPTION

The technical solutions in the embodiments of the present application will be clearly and completely described below which combine with reference to the accompanying drawings in the embodiments of the present application. Apparently, the described embodiments are some of the embodiments of the present application rather than all of the embodiments. Based on the embodiments of the present application, it is understandable to a person skilled in the art, any other embodiments obtained by persons skilled in the art without creative effort shall all fall into the scope of the present application. It will be understood that the specific embodiments described herein are merely some embodiments and not all.

In general, the word "module," as used herein, refers to logic embodied in hardware or firmware, or to a collection of software instructions, written in a programming language, for example, Java, C, or assembly. One or more software instructions in the modules may be embedded in firmware, such as an EPROM, magnetic, or optical drives. It will be appreciated that modules may comprise connected logic units, such as gates and flip-flops, and may comprise programmable units, such as programmable gate arrays or processors, such as a CPU. The modules described herein may be implemented as either software and/or hardware modules and may be stored in any type of computer-readable medium or other computer storage systems. The term "comprising" means "including, but not necessarily limited to"; it specifically indicates open-ended inclusion or membership in a so-described combination, group, series, and the like. The application is illustrated by way of example and not by way of limitation in the figures of the accompanying drawings in which like references indicate similar elements. It should be noted that references to "an" or "one" embodiment in this application are not necessarily to the same embodiment, and such references can mean "at least one."

Terms "first", "second", and the like used in the specification, the claims, and the accompanying drawings of the present application are used to distinguish different objects rather than describe a particular order. A term "comprise" and its variations are intended to cover a non-exclusive inclusion. For example, a process, method, system, product, or apparatus including a series of steps or units is not limited to the listed steps or units, and may optionally include other steps or units that are not listed, or other steps or units inherent to the process, method, product, or device.

Unless otherwise defined, all technical and scientific terms used herein have the same meaning as commonly understood by those skilled in the technical field of the present application. The terminology used in the specification of the present application herein is for the purpose of describing specific embodiments only, and is not intended to limit the present application. The term "and/or" as used herein includes any and all combinations of one or more related listed items.

A related art is simply described as below.

Currently, users, such as drivers or pedestrian, obtain traffic information from a traffic control center by a mobile web. The users need to find out the traffic information of a specific region manually, or remove the traffic information besides the specific region, which is laborious. At mean time, the traffic information are limited and independent from each other. For example, traffic information may include a traffic flow on a road, a traffic control information, and vehicle accident, which are independent from each other, the users need to find out a corresponding answer by associated a relationship therebetween. For example, the users need to check the information of traffic flow and the vehicle accident respectively, and analyzes whether the information of the three parts are occurred in a common time period.

Radio broadcast also used to play the traffic information, and take turns playing programme and the traffic information. The user fails to obtain the traffic information in time, and the traffic information played by the broadcast maybe not the specific traffic information wanted to know by the users.

Therefore, the present application provides a method of generating traffic information, a method of prompting traffic information, a roadside device, a receiving terminal device, and a traffic system.

Figure 1:
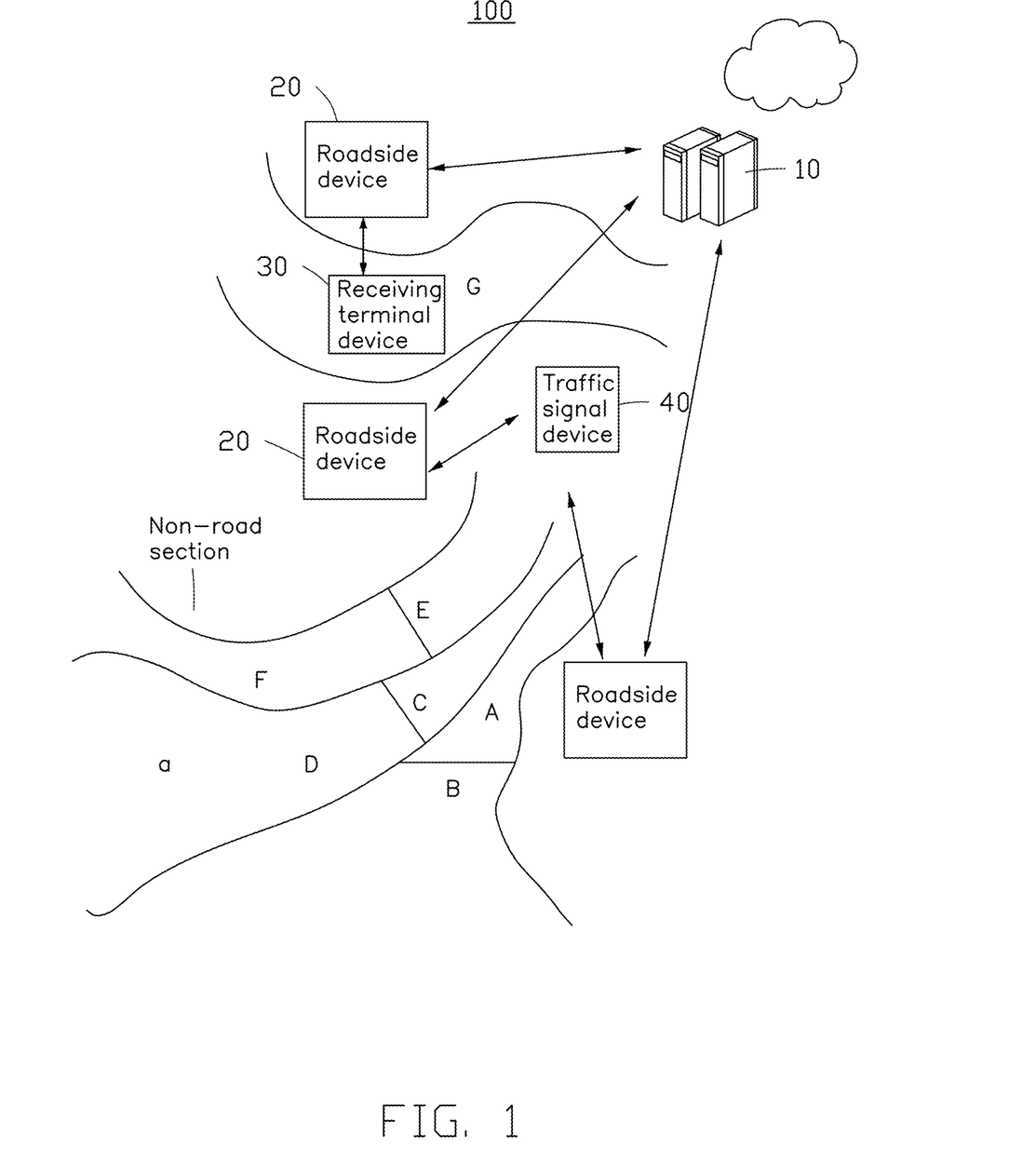
FIG. 1 is a diagram illustrating an embodiment of a traffic system in one application scenario according to the present application.

Referring to FIG. 1, it is a diagram of an embodiment of the traffic system in one application scenario. The traffic system 100 may include a traffic control center 10, and a plurality of roadside devices 20. The traffic control center 10 may communicate with the plurality of roadside devices 20 through a wireless communication technology, such as $5^{th}$ Generation Mobile Communication Technology (5G). The traffic control center 10 may be deployed in a plurality of servers, has an ability of data storage and computing capacity. The traffic control center 10 is configured to collect traffic information of different road sections, and transmits the traffic information to one or more roadside deice 20. The roadside device 20 is mounted on a side of a road, and also has an ability of data storage and computing capacity. The roadside device 20 may be communicated with a receiving terminal device 30 and has a gateway function. The roadside device 20 and the receiving terminal device 30 communicate with each other through BLUETOOTH technology. The receiving terminal device 30 may be a vehicle 30 or an electronic device 30. The electronic device may be a mobile phone, a smart watch, or a notebook, and so on. The traffic information may include traffic accident information and traffic information.

In some embodiments, the traffic system 100 also may include traffic signal device 40. The traffic signal device 40 is configured to command vehicles and pedestrian. The traffic signal device 40 may include a traffic light. The traffic signal device 40 is configured to transmit traffic light device information to the roadside device 20.

Figure 2:
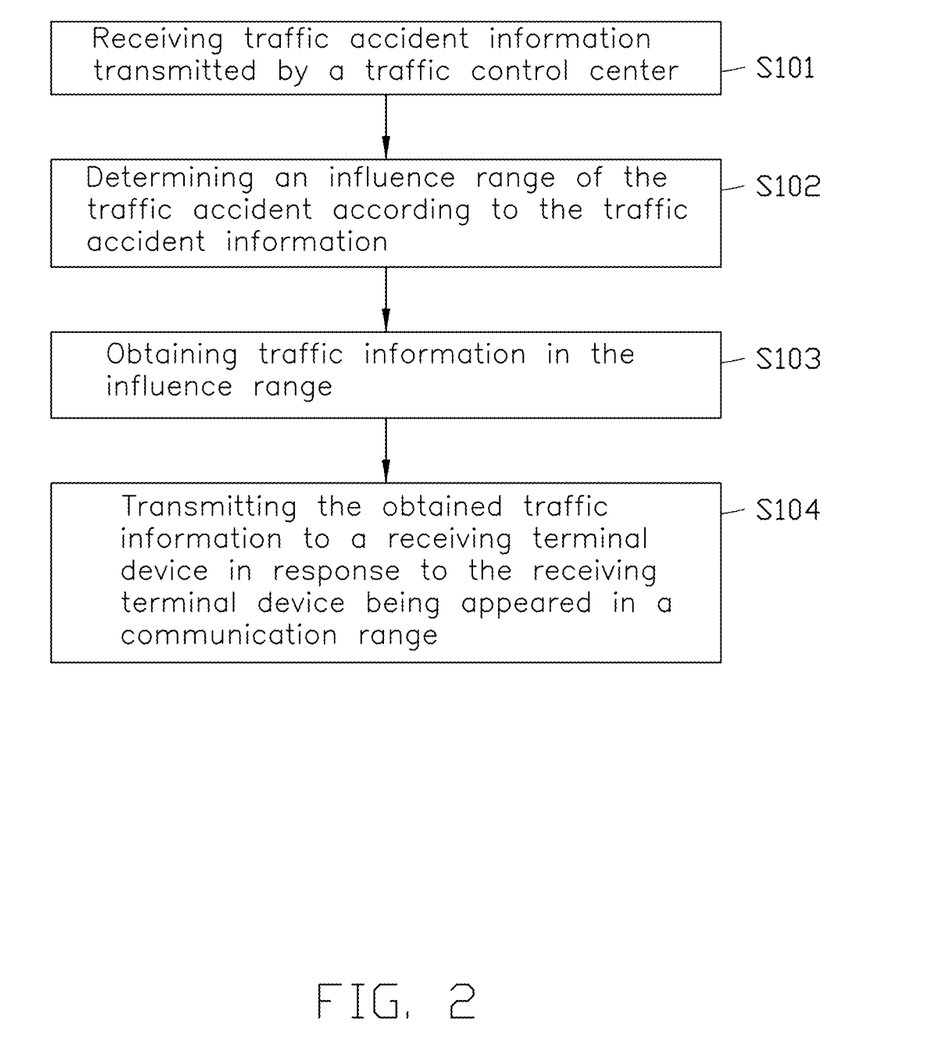
FIG. 2 is a flowchart illustrating an embodiment of a method of generating traffic information according to the present application.

Referring to FIG. 2, it is a flowchart of the method of generating traffic information the present application. The method of generating traffic information is used in the traffic system 100, specifically used in the roadside device 20. The method of generating traffic information includes the following steps.

In block S101: traffic accident information transmitted by the traffic control center 10 is received.

The traffic control center 10 pre-stores a transmitting condition of the traffic accident information. The transmitting condition may include that the traffic accident information is transmitted to the roadside devices 20 of other road sections, which are in a first predefined range of the road section with the where the traffic accident information, after the traffic accident information of a road section is obtained. For example, the transmitting condition may include that the traffic accident information is transmitted to the roadside devices 20 of other road sections A, B, C, E, F, and D, which are in a first predefined range of the road section D with the where the traffic accident information, after the traffic accident information of the road section D is obtained.

The traffic accident information may include a traffic accident location, a content of the traffic accident, and a solving time, and so on. The solving time is a time duration of completely processing the accident and allowing the receiving terminal device 30 to pass through. For example, the traffic accident information may include that the traffic accident location is the road section a, the content of the accident is a crash between two vehicles, and the solving time is N hours.

In block S102: an influence range of the traffic accident is determined according to the traffic accident information.

The influence range of the traffic accident is a range effecting other transports or pedestrian to pass through. The range may be represented by road sections in a second predefined range distanced from the accident location. For example, using the location of the road section a as the accident location, the road sections E, B, D, F are in the influence range. The influence range also may be represented by regions in the second predefined range distanced from the accident location. For example, the road sections E, B, D, F and a non-road section close to the road section F. it should be noted that, the boundary shape of the predefined rage may be any shape, such as a circle, a rectangular, an ellipse, and so on.

The more serious the traffic accident information indicates, the larger the influence range is. It can be understood that, a road situation, such as traffic congestion and traffic control, may occurs when going to the road section with the traffic accident. The more serious the traffic accident is, the longer the road section will be due to the traffic congestion and the traffic control, in other words, the larger the influence range becomes.

In block S103: traffic information in the influence range is obtained.

The traffic control center 10 receives traffic information from road infrastructures or transmitted by other terminal devices. The road infrastructures may include roadside devices 20 and road monitors. Other terminal devices may include the electronic devices 30 and the vehicles 30, and so on. The traffic information may include road information and vehicle information, which are transmitted by the roadside devices 20, the vehicles 30, or the road monitors. The vehicle information may include a speed of the vehicle, a number of the vehicles, and so on. The road information may include the location of the road. The traffic information also may include a traffic control information, traffic enforcement information, a maximum limitation speed, a minimum limitation speed, and so on, which are inputted by operators or transmitted by the electronic devices 30.

After, the traffic control center 10 stores traffic information of each road section, the roadside device 20 may obtains the traffic information in the influence range from the traffic control center 10. For example, the roadside device 20 obtains the traffic information of the road sections E, B, D, and F.

In block S104: the traffic information is transmitted to the receiving terminal device 30 in response to the receiving device 40 being appeared in a communication range.

In one embodiment, the roadside device 20 executes a Bluetooth broadcast, when the receiving terminal device 30 appears in a broadcast range, the traffic information is transmitted to the receiving terminal device 30.

Figure 3:
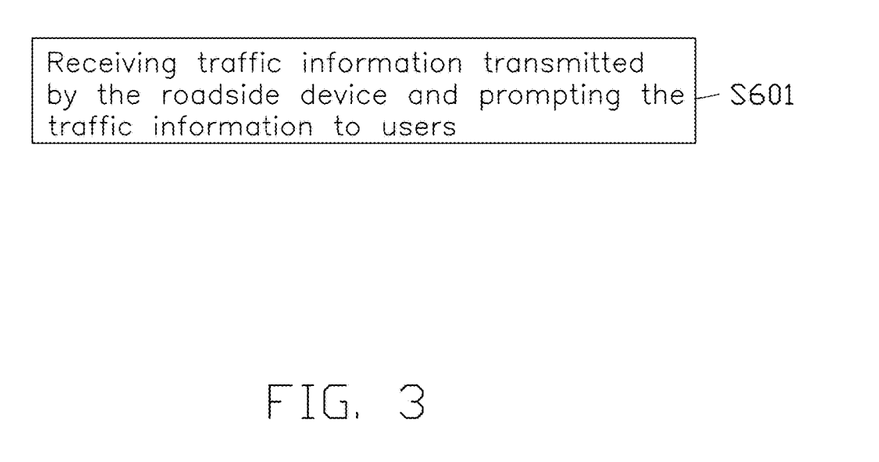
FIG. 3 is a diagram illustrating an embodiment of the method of generating traffic information in one application scenario according to the present application.

Referring to FIG. 3, in one application scenario, on the road section D a crash occurs between two vehicles 30. Law enforcement officers report the traffic accident information to the traffic control center 10. After receiving the traffic accident information of the road section D, the traffic control center 10 transmits the traffic accident information to the roadside device 20 on the road section F. The roadside device 20 determines the influence range of the traffic accident based on the traffic accident information. The influence range includes the road sections F and D. The roadside device 20 obtains the traffic information of the road sections F and D from the traffic control center 10. When the vehicle 30 drives into the broadcast range of the roadside device 20, the roadside device 20 transmits the traffic information of the road sections F and D to the vehicle 30. Therefore, the receiving terminal device 30 in the influence range obtains the traffic information from an accident location to a current location, the users may be able to plan ahead, for decreasing an effect of the accident. For example, the users may change a driving lane for preventing from being driving into the road section of traffic congestion.

It is understood that, after the roadside device 20 receives the traffic accident information transmitted from the traffic control center 10, the influence range may be determined according to the traffic accident information, and then obtains the traffic information in the influence range from the traffic control center 10. In response to the receiving terminal device 30 appears in the communication range, the traffic information is transmitted to the receiving terminal device 30 for making the receiving terminal device 30 to obtain the relative traffic information in time. The users do not need to check and filter the desired traffic information, time and labor are saved. Meantime, after receiving the traffic accident information, the influence range is determined and the traffic information in the influence range is obtained, therefore, the traffic information obtained after the accident occurs reflects an in-time influence of the accident.

In some embodiments, the block of the influence range is determined according to the traffic accident information further includes the following step.

In block S201, a distance road section between a traffic accident location and the roadside device 20 is determined.

The distance road section is a road section between the traffic accident location and the roadside device 20. The traffic accident information also includes the distance road section. The traffic accident location is a region where the transport and pedestrian fail to pass through because of the accident. The traffic accident location may include an accident location and involved regions. The involved regions are place involved by the accident. For example, the vehicle 30 is crashed at the accident location, debris of the vehicle 30 are splashed on some place, which cause the road infrastructure being damaged or the road being damaged and being unable to pass through, therefore, the places are the involved region.

In block S202: the distance road section is determined as the influence range of the traffic accident.

As the recited above, the road section may represent the influence range. As shown in FIG. 3, the road sections F and D are the distance road section between the roadside device 20 and the traffic accident location, and the road sections F and D are determined as the influence range.

It is understood that, the distance section between the accident location and the roadside device 20 may include the road sections towards to the accident location. Due to the road sections towards to the accident location may occurs the condition of traffic congestion and traffic control, therefore, after the distance section is determined as the influence range, the roadside device 20 may obtain the traffic information of the distance section, and transmit to the receiving terminal device 30 in the communication range. The receiving terminal device 30 may know the traffic information between the accident location and the roadside device 20 in time.

In some embodiments, the block of the influence range of the traffic accident is determined according to the traffic accident information may include following steps.

In block S301: dynamic section is obtained according to the solving time.

It is understood that, the more serious of the traffic accident is, the longer a time of completely handling the accident and resuming the traffic takes, that is the longer the solving time takes. Therefore, the dynamic section may be calculated according to the solving time. For example, as shown in FIG. 1, the dynamic section may include the road sections D and F, or the road sections D, F, and E. The longer the solving time takes, the longer the dynamic section is.

In block S302: the dynamic section is determined as the influence range of the traffic accident.

As shown in FIG. 2, when the dynamic section includes the road sections D and F, the influence range of the traffic accident includes the road sections D and F. When the dynamic section includes the road sections D, F, and E, the influence range of the traffic accident includes the road sections D, F, and E.

It is understood that, by involving the solving time, the dynamic section may be used to determine the influence range of the traffic accident, for making the users in the dynamic influence range to receive the traffic information, which is needed to know by the users.

In some embodiments, the block of the influence range of the traffic accident is determined according to the traffic accident information may include following steps.

In block S401: the distance section between the accident location and the roadside device 20 is determined.

In block S402: the dynamic section is determined according to the solving time.

In block S403: the influence range of the traffic accident is determined according to the distance section and the dynamic section.

In one embodiment, when a length of the dynamic section is longer than a length of the distance section, it determines that the dynamic section serves as the influence range of the traffic accident. For example, if the distance section includes the road sections D and F, and the dynamic section includes the road sections D, F, and E, it means that the length of the dynamic section is longer than the length of the distance section. The road sections D, F, and E are determined as the influence range of the traffic accident.

In another embodiment, when the length of the dynamic section is shorter than or equal to the length of the distance section, it determines that the distance section serves as the influence range of the traffic accident. For example, if the distance section includes the road sections D, F, and E, and the dynamic section includes the road sections D and F, it means that the length of the distance section is longer than the length of the dynamic section. The road sections D, F, and E are determined as the influence range of the traffic accident.

It is understood that, while determining the influence range, the distance section between the accident location and the roadside device 20, and the solving time are being overall considered. The influence range may be longer than the distance between the traffic accident location and the roadside device 20, and by the change of the solving time, the influence range dynamically changes.

Referring to FIG. 3, in one application scenario, in the road section D, two vehicles are crashed. After the roadside device 20 receives the traffic accident information, the determined influence range between the accident location and the roadside device 20 includes the road sections D and F. The dynamic section calculated according to the solving time includes the road sections D, F, and E. The roadside device 20 determines the dynamic section to be the influence range, which includes the road sections D, F, and E. The roadside device 20 obtains the traffic information of the road sections D, F, and E from the traffic control center 10. When the vehicle 30 drives into the broadcast range of the roadside device 20, the roadside device 20 transmits the traffic information of the road sections D, F, and E to the vehicle 30.

In some embodiments, a method of generating the traffic information further includes the following steps.

In block S501: device information of traffic signal devices in a predefined device range is obtained.

The predefined device range may be set according to actual situation. For example, a distance from the traffic signal device to the roadside device 20 may be in the predefined device range. In the predefined device range, there may be one or more traffic signal device 40. The traffic information may include display state of a traffic light, seconds of forbidden to pass through, and second of allowing to pass through, and so on. For example, the display state of the traffic light may be a red light, a green light, or a yellow light. In one embodiment, the device information may include the red light and N seconds of forbidden to pass through.

In block S502: the receiving terminal device in the communication range is found.

In block S503: the device information is transmitted to the receiving terminal device 30.

Referring to FIG. 3, in one application scenario, the predefined device range of the roadside device 20 may include the road sections E and F, the traffic signa devices 40 between the road sections E and F belong to be in the predefined device range. The vehicle 30 appears in the communication range of the roadside device 20, the roadside device 20 transmits the device information to the vehicle 30 for prompting the red light and the second of forbidden to pass through to the vehicle 30, thus the users notice the device information.

It is understood that, the roadside device 20 also may transmit the device information of the traffic signal device 40 to the receiving terminal device 30, for prompting the device information to the receiving terminal device 30, therefore the users notices the device information of the traffic signal device 40 in time and plans ahead.

Figure 4:
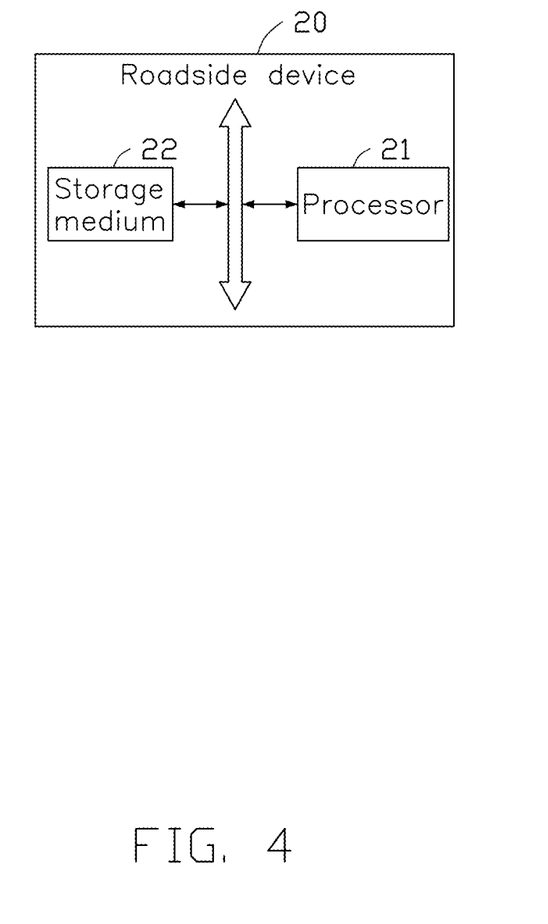
FIG. 4 is a flowchart illustrating an embodiment of a method of prompting traffic information according to the present application.

The present application further provides a method of prompting traffic information, used in the traffic system 100. In detail, used in the receiving terminal device 30. Referring to FIG. 4, the method may include the following step. In block S601: the traffic information transmitted by the roadside device 20 is received, and the traffic information is prompted to the users. There are multiple manners of the receiving terminal device 30 to prompt the user. For example, the receiving terminal device 30 plays or report traffic information for prompting the user.

In one embodiment, the traffic information transmitted by the roadside device 20 is received, and is prompted to the users.

Referring to FIG. 3, in an application scenario, the vehicle 30 drives into the communication range of the roadside device 20, the roadside device 20 transmits the traffic information to a display terminal of the vehicle 30, and the display terminal displays and reports the traffic information, which includes that two vehicles are crashed at the road section D, the solving time of completely process the traffic accident estimates to be M hours, a required time of driving from the road section F to the road section D is K hours, the maximum limitation speed of the road sections D and F is b m/s, and a minimum limitation speed is c m/s, please do not speeding.

In one application scenario, when the electronic device 30 handed by the users enters into the communication range of the roadside 20, the roadside device 20 transmits the traffic information to the electronic device 30. The electronic device 30 displays and reports the traffic information, which includes that two vehicles are crashed at the road section D, the solving time of completely process the traffic accident estimates to be M hours, a required time of driving to the road section D is G hours.

In one application scenario, the vehicle 30 drives into the communication range of the roadside device 20, the roadside device 20 transmits the traffic information to the display terminal of the vehicle 30, the display terminal displays and reports the traffic information, which includes that in front L meter, there is a camera for capturing photo of driving through a red light and speed measuring, please drive carefully.

The method of prompting the traffic information further includes after the receiving terminal device 30 receives the traffic information, when the speed of the electronic device 30 is besides a speed range, the speed of the electronic device 30 is adjusted to be in the speed range. The speed range may be from the minimum limitation speed to the maximum limitation speed. The minimum limitation speed and the maximum limitation speed are not included in the speed range.

In one application scenario, the vehicle 30 drives into the communication range of the roadside device 20, the roadside device 20 transmits the traffic information to the vehicle 30. A driving assistance system of the vehicle 30 is triggered to decrease the speed of the vehicle 30 to be below the maximum limitation speed.

In another embodiment, the receiving terminal device 30 receives the device information of the traffic signal device 40 transmitted by the roadside device 20, the device information of the traffic signal device 40 is prompted to the users.

Referring to FIG. 3, in one application scenario, the vehicle 30 drives into the communication range of the roadside device 20, the roadside device 20 transmits the device information to the display terminal of the vehicle 30. The display terminal displays and reports the device information, which includes that there is a traffic light in front intersection, and please driving carefully.

The method of prompting the traffic information further includes adjusting the speed of the receiving terminal device 40 according to the device information after the receiving terminal device 30 receives the device information.

In one application scenario, the vehicle 30 drives into the communication range of the roadside device 20, the roadside device 20 transmits the device information to the vehicle 30. The device information indicates that the display state of the traffic signal device 40 turns from the yellow light to the red light, the driving assistance system of the vehicle 30 is triggered for adjusting the speed of the vehicle 30 according to the display state, which make the vehicle 30 to stop at a zebra crossing when the traffic signal device 40 displays the red light.

It is understood that, by adjusting the state of the receiving terminal device 30 according to the device information, the receiving terminal device 30 may prevent from passing through the red light, and a chance of generating an accident may be decreased.

In some embodiments, the method of prompting the traffic information may further include the following steps.

In block S701: the traffic information is stored in a traffic information list.

The traffic information list is configured to store one or more traffic information, after the receiving terminal device 30 receives the traffic information, the traffic information is stored in the traffic information list.

In block S702: the traffic information being selected is displayed or broadcasted in response to a selection operation of the users.

In one application scenario, the vehicle 30 drives into the communication range of the roadside device 20, the roadside device 20 continuously transmits the traffic information to the vehicle 30. The vehicle 30 stores the traffic information in the traffic information list. The users clicks one traffic information in the traffic information list, and the display terminal of the vehicle 30 displays and broadcasts the selected traffic information, which includes that two vehicles are crashed at the road section D, the solving time of completely process the traffic accident estimates to be M hours, a required time of driving from the road section F to the road section D is K hours, the maximum limitation speed of the road sections D and F is b m/s, and a minimum limitation speed is c m/s, please do not speeding.

In one application scenario, when the electronic device 30 handed by the users enters into the communication range of the roadside 20, the roadside device 20 continuously transmits the traffic information to the electronic device 30. The electronic device 30 stores the traffic information in the traffic information list. The user clicks one traffic information in the traffic information list, the display terminal of the electronic device 30 displays and reports the traffic information, which includes that a car and a truck are crashed at the road section D, no human hurts, the road section D is under a traffic control, the solving time of completely process the traffic accident estimates to be M hours, a required time of driving to the road section D is G hours.

It is understood that, by storing the traffic information in the traffic information list, the selected traffic information is displayed and broadcasted in response to the selection operation of the users. Therefore, the traffic information desired by the user may be freely selected.

Figure 5:
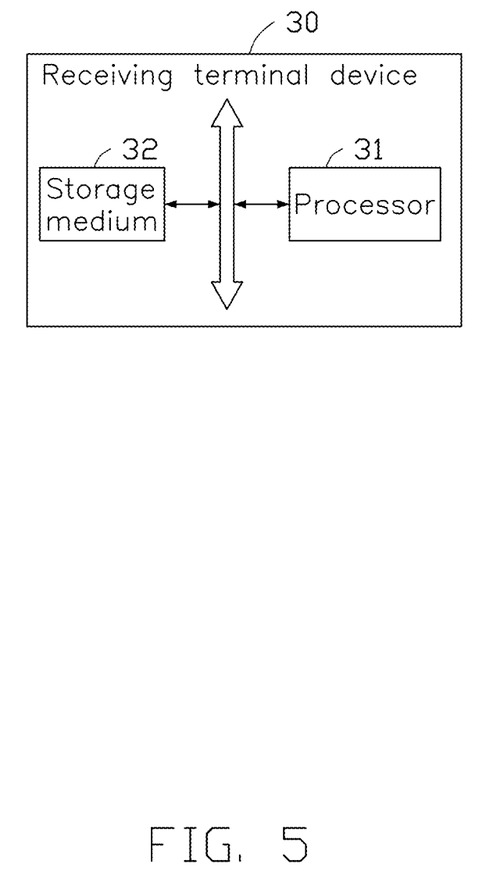
FIG. 5 is a diagram illustrating an embodiment of a roadside device according to the present application.

Referring to FIG. 5, it is a diagram of an embodiment of the roadside device 20 of the present application. In one embodiment, the roadside device 20 includes a storage medium 22 and at least one processor 21. Those skilled in the art would understand that the structure shown in the FIG. 5 is not the limitations of the embodiment of the present application, the roadside device 20 may include more or less other hardware or software than shown, or have different component arrangements.

As an alternative embodiment, the roadside device 20 may include a terminal that may automatically perform numerical calculation and/or information processing according to pre-set or stored instructions, and its hardware includes, not being limited, a microprocessor and an application specific integrated circuit, programmable gate arrays, digital processors and embedded devices, and so on. As an alternative embodiment, the storage medium 22 is configured to store computer programs and various data. The storage medium 22 may include Read-Only Memory (ROM), Random Access Memory (RAM), Programmable Read-Only Memory (PROM), or any other non-transitory computer-readable storage medium that can be used to carry or store data.

As an alternative embodiment, the at least one processor 21 may be composed of an integrated circuit. For example, the at least one processor 21 may be composed of a single packaged integrated circuit or can be composed of multiple packaged integrated circuits with the same function or different function. The at least one processor 21 includes one or more central processing units (CPUs), one or more microprocessors, one or more digital processing chips, one or more graphics processors, and various control chips. The at least one processor 21 is a control unit of the roadside device 20. The at least one processor 21 executes programs or modules or instructions stored in the storage medium 22, and invokes data stored in the storage medium 22 to perform various functions of the roadside device 20 and to process data, for example, to perform the above recited method of generating the traffic information.

Referring to FIG. 6, it is a diagram of an embodiment of the receiving terminal device 30 of the present application. In one embodiment, the receiving terminal device 30 includes a storage medium 32 and at least one processor 31. Those skilled in the art would understand that the structure shown in the FIG. 6 is not the limitations of the embodiment of the present application, the receiving terminal device 30 may include more or less other hardware or software than shown, or have different component arrangements.

As an alternative embodiment, the receiving terminal device 30 may include a terminal that may automatically perform numerical calculation and/or information processing according to pre-set or stored instructions, and its hardware includes, not being limited, a microprocessor and an application specific integrated circuit, programmable gate arrays, digital processors and embedded devices, and so on. As an alternative embodiment, the storage medium 32 is configured to store computer programs and various data. The storage medium 32 may include Read-Only Memory (ROM), Random Access Memory (RAM), Programmable Read-Only Memory (PROM), or any other non-transitory computer-readable storage medium that can be used to carry or store data.

As an alternative embodiment, the at least one processor 31 may be composed of an integrated circuit. For example, the at least one processor 31 may be composed of a single packaged integrated circuit or can be composed of multiple packaged integrated circuits with the same function or different function. The at least one processor 31 includes one or more central processing units (CPUs), one or more microprocessors, one or more digital processing chips, one or more graphics processors, and various control chips. The at least one processor 31 is a control unit of the receiving terminal device 30. The at least one processor 31 executes programs or modules or instructions stored in the storage medium 32, and invokes data stored in the storage medium 32 to perform various functions of the receiving terminal device 30 and to process data, for example, to perform the above recited method of prompting the traffic information.

The present application further provides a storage medium. The storage medium stores program instructions. When the program instructions run on a computer device, for making the computer device to execute the above recited method of generating traffic information and the method of prompting traffic information.

Those skilled in the art will recognize that the above described embodiments are only intended to illustrate the invention and are not intended to limit the invention, and numerous possible modifications and variations within the spirit of the invention will fall within the scope of the invention.

What is claimed is:

1. A method of generating traffic information, used in a traffic system; the traffic system comprises at least one roadside device and at least one receiving terminal device; at least one of the at least one roadside device and the at least one receiving terminal device comprises a processor executes computer programs to implement following processes:

receiving traffic accident information transmitted by a traffic control center;
determining an influence range of the traffic accident according to the traffic accident information;
obtaining traffic information in the influence range; and
transmitting the obtained traffic information to the at least one receiving terminal device in response to the at least one receiving terminal device being appeared in a communication range.

2. The method of claim 1, wherein the step of determining the influence range of the traffic accident according to the traffic accident information comprises:

determining a distance section between an accident location and the at least one roadside device; and determining the influence range of the traffic accident according to the distance section.

3. The method of claim 1, wherein the step of determining the influence range of the traffic accident according to the traffic accident information comprises:
   determining a dynamic section according a solving time of a traffic accident; and
   determining the influence range of the traffic accident according to the dynamic section.

4. The method of claim 1, wherein the step of determining the influence range of the traffic accident according to the traffic accident information comprises:
   determining a distance section between an accident location and the at least one roadside device;
   determining a dynamic section according a solving time of a traffic accident; and
   determining the influence range of the traffic accident according to the distance section and the dynamic section.

5. The method of claim 4, wherein the step of determining the influence range of the traffic accident according to the distance section and the dynamic section comprises:
   when a length of the dynamic section is larger than length of the distance section, it determines that the dynamic section serves as the influence range of the traffic accident; and
   when a length of the dynamic section is shorter than or equal to the length of the distance section, it determines that the dynamic section serves as the influence range of the traffic accident.

6. The method of claim 3, wherein the longer the solving time takes, the longer the length of the dynamic section is.

7. The method of claim 1, wherein the method further comprises:
   obtaining device information of traffic signal devices in a predefined device range;
   finding the at least one receiving terminal device in the communication range; and
   transmitting the device information to the at least one receiving terminal device.

8. A roadside device comprises:
   a storage medium; and
   at least one processor;
   wherein the storage medium stores computer programs; and the at least one processor executes the computer programs to implement following processes:
      receiving traffic accident information transmitted by a traffic control center;
      determining an influence range of the traffic accident according to the traffic accident information;
      obtaining traffic information in the influence range; and
      transmitting the obtained traffic information to the at least one receiving terminal device in response to the at least one receiving terminal device being appeared in a communication range.

9. The roadside device of claim 8, wherein the processor further:
   determining a distance section between an accident location and the at least one roadside device; and
   determining the influence range of the traffic accident according to the distance section.

10. The roadside device of claim 8, wherein the processor further:
    determining a dynamic section according a solving time of a traffic accident; and
    determining the influence range of the traffic accident according to the dynamic section.

11. The roadside device of claim 8, wherein the processor further:
    determining a distance section between an accident location and the at least one roadside device;
    determining a dynamic section according a solving time of a traffic accident; and
    determining the influence range of the traffic accident according to the distance section and the dynamic section.

12. The roadside device of claim 11, wherein the processor further:
    when a length of the dynamic section is larger than length of the distance section, it determines that the dynamic section serves as the influence range of the traffic accident; and
    when a length of the dynamic section is shorter than or equal to the length of the distance section, it determines that the dynamic section serves as the influence range of the traffic accident.

13. The roadside device of claim 11, wherein the longer the solving time takes, the longer the length of the dynamic section is.

14. The roadside device of claim 8, wherein the processor further:
    obtaining device information of traffic signal devices in a predefined device range;
    finding the at least one receiving terminal device in the communication range; and
    transmitting the device information to the at least one receiving terminal device.

* * * * *